Aug. 31, 1954 — A. W. GAIR — 2,687,925
SHAFT BEARING HANGER
Filed June 2, 1951
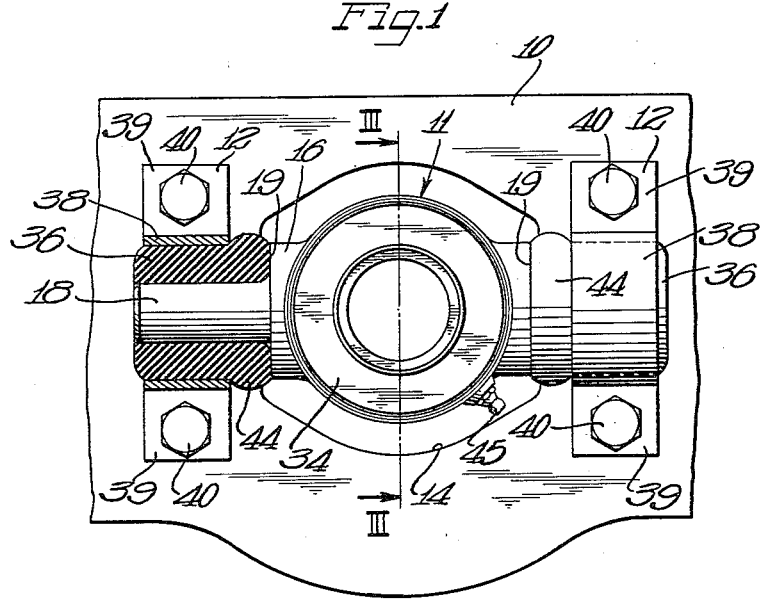
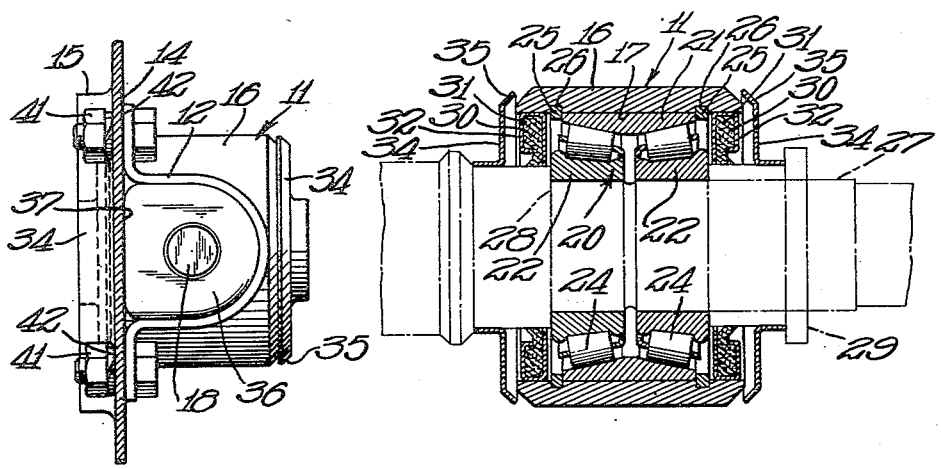
Inventor:
Albert W. Gair
by [Attorneys signature] Attys Patented Aug. 31, 1954

2,687,925

UNITED STATES PATENT OFFICE 2,687,925

SHAFT BEARING HANGER

Albert W. Gair, Fraser, Mich., assignor to Thompson Products, Inc., Cleveland, Ohio, a corporation of Ohio Application June 2, 1951, Serial No. 229,580

7 Claims. (Cl. 308—28)

This invention relates to an improved shaft bearing hanger for a vehicle or the like. More particularly, the invention relates to a simplified and improved trunnion type shaft mounting assembly for resiliently and rotatably supporting a shaft from a vehicle cross frame member.

The shaft bearing hangers of the present invention may be utilized to resiliently support a multi-section vehicle propeller shaft at or near the junction points of the sections. In mounting such a multi-section shaft the hanger of this invention substantially prevents the transmission of vibrations and "whip" from the shaft to the vehicle frame and reduces or eliminates noise. The resilient mounting provides for self-alignment between the shaft and the frame to prevent undesirable bearing loads and accommodates a small amount of fore-and-aft or axial movement of the shaft when the vehicle engine moves on its rubber mounts.

According to this invention, the shaft bearing hanger includes a central transverse bore with an anti-friction bearing secured therein for rotatably supporting a vehicle propeller shaft. The housing is provided with a pair of trunnion mounts in the form of oppositely extending aligned bosses at right angles to the bore for receiving resilient D-shaped bushings thereabout with the flat faces of the bushings abutting a vehicle cross frame member and with the inner ends of the bushings engaging shoulders formed at the inner ends of the bosses. The bushings are retainingly engaged and compressed or preloaded by a pair of U-shaped attachment brackets with oppositely extending feet fixedly secured to the frame member. Means are provided for introducing lubricant into the interior of the bore for lubricating the bearing, and sealing and particle deflecting means are provided at the ends of the bore.

It is, therefore, an object of the present invention to provide an improved shaft bearing hanger.

Another object of the invention is to provide a simplified shaft mounting assembly including resiliently mounted trunnions.

A further object of the invention is to provide an improved shaft bearing hanger including antifriction shaft support means and oppositely extending housing portions resiliently mounted in a pair of attachment brackets secured to a stationary member.

An additional object of the present invention is to provide a shaft bearing hanger for rotatably supporting a shaft therein and including sealing means and particle deflecting means and resilient mounts for preventing transmission of shaft vibration to a vehicle frame.

Still another object of the present invention is to provide improved resilient mounting means for a rotatable shaft to accommodate self-alignment between the shaft and a vehicle frame to eliminate undesirable bearing loads.

A still further object of the invention is to provide an improved resiliently mounted shaft bearing hanger which will accommodate a small amount of fore-and-aft movement of the shaft to allow for movement of the vehicle engine on its rubber mounts.

Other objects, features and advantages of the present invention will be apparent from the following detailed description of one embodiment, by way of preferred example only, taken in conjunction with the accompanying drawings.

On the drawings:

Figure 1 is a fragmentary front elevational view, with one mount in section, of a shaft bearing hanger of the present invention secured to a vehicle cross frame member.

Figure 2 is a fragmentary end elevational view of the structure shown in Figure 1 with a portion of the frame member broken away and a portion in section.

Figure 3 is an enlarged sectional view taken along line III—III of Figure 1 and showing the interior of the housing with the shaft extending therethrough shown in phantom.

As shown on the drawings:

In Figure 1 is illustrated a cross frame member 10 of a vehicle or the like with a shaft bearing hanger assembly 11 secured thereto by means of a pair of attachment brackets 12, 12. An aperture 14 is formed through the frame member 10 and has a continuous reinforcement flange 15 formed therearound with the flange spaced from the central portion of the bearing hanger 11.

The hanger 11 comprises a body portion or housing 16 with a central bore 17 formed therethrough. A pair of trunnion mounts are provided by oppositely extending gudgeons or bosses 18 formed at right angles to the bore 17. Annular shoulders 19, 19 are formed at the junctures of the bosses 18 with the central portion of the housing.

An anti-friction bearing 20, including an outer race 21, an inner race 22 formed in two parts and two rows of roller bearings 24, has its outer race secured within the bore 17 by means of a pair of snap rings 25, 25 engaged in an annular groove 26, 26 adjacent the opposite sides of the outer race. A propeller shaft 27 may be rotatably secured within the bore 17 by means of the bearing 20 with the inner race portion 22 disposed thereabout. One side of the inner race abuts an annular shaft shoulder 28, and the other side of the inner race is engaged by a retaining collar 29.

Sealing means are provided at the end portions of the bore 17 and in the present instance comprise a pair of sealing rings 30, 30 each with an inner resilient sealing portion 31 of rubber, felt or the like retained in a sheet metal backing portion 32. The backing portions 32 are fixedly secured in the end portions of the bore 17 as by being press fitted therein, and the inner edges of the resilient portion 31 extend radially inwardly beyond the backing portion and slidingly engage the shaft 27 and the collar 29, respectively, to provide peripheral rotatable seals thereabout.

Annular protective covers such as sheet metal dust covers 34, 34 are secured to the shaft 27 and the collar 29, respectively, outwardly of the end of the bore 17 and are provided with inwardly deflected peripheral flanges 35 closely spaced from the edges of the housing 16 about the bore. Thus, the covers 34 serve to deflect flying pebbles, rocks and the like.

According to the present invention resilient mounting means are provided to substantially eliminate the transmission of vibration and noise from the propeller shaft to the vehicle frame, to provide self-alignment between the shaft and the frame and to permit a small amount of fore-and-aft shifting of the shaft occasioned by movement of the vehicle engine. In the present embodiment such means comprise a pair of resiliently yieldable bushings, formed of rubber or the like, disposed in conforming relation about the gudgeons 18 and abutting the shoulders 19. The bushings 36 are generally D-shaped as viewed from the ends and have flat faces 37 abutting the opposing face of the cross frame member 10.

For securing the bushings 36 to the cross frame member the pair of attachment brackets 12 are provided with generally U-shaped bight portions 38 which conformingly embrace the arcuate surface of the bushings. The brackets 12 are provided with oppositely extending integral feet 39 which abut the surface of the frame member 10 and are fixedly secured thereto by means of bolts 40, nuts 41 and lock washers 42.

It will be noted that the inward edges of the bight portions 38 are substantially spaced from the opposing shoulders 19 of the housing 16. The bight portions compress or pre-load the clamped sections of the bushing so that an integral annular bead or rib 44 bulges out between each of the shoulders and the respective bight portion. The ribs 44 serve to prevent direct metal to metal contact between the attachment brackets 12 and the housing 16 and allow resilient side play of the housing with respect to the cross frame member. Any pivoting of the housing is accommodated by shear or torsional twist in the bushings.

In order to permit the introduction of lubricant into the interior of the bore 17 for lubricating the anti-friction bearing 20 a lubricant fitting 45 is inserted through an aperture (not shown) in the defining wall of the bore.

From the above description it will be readily understood that the present invention provides an improved and simplified shaft bearing hanger including efficient means for resiliently mounting the hanger on a vehicle cross frame member, for rotatably mounting a propeller shaft with respect to the vehicle frame and for permitting limited movement of the shaft without transmitting this movement to the frame.

It will be understood that modifications and variations may be effected without departing from the scope of the novel concepts of the present invention.

I claim as my invention:

1. A hanger for resiliently and rotatably mounting a propeller shaft through an apertured cross frame member of a vehicle, comprising a housing having a central bore therethrough and a pair of integral oppositely extending gudgeons at right angles to said bore, a preloaded resiliently yieldable bushing about each of said gudgeons, a pair of U-shaped attachment brackets having outwardly extending attachment feet and bight portions with the bight portions engagingly embracing said bushings and holding a side of each bushing against said frame member, means fixedly securing said attachment feet to the cross frame member to resiliently suspend said housing in spaced relation to the defining edges of the frame member aperture, an anti-friction bearing including an inner race and an outer race, means retaining the outer race of said bearing in said housing bore, and means for retaining the inner race of said bearing about said propeller shaft to rotatably support the shaft in the housing.

2. In a vehicle having a rotatable propeller shaft, a hanger for resiliently and rotatably securing the shaft to a cross frame member, comprising a housing having a central bore therethrough and a pair of oppositely extending aligned gudgeons at right angles to the bore with annular shoulders formed on the housing at the inner ends of the gudgeons, a D-shaped resiliently yieldable bushing encircling each of said gudgeons with the inner bushing ends engaging said shoulders and with the flat faces of the bushings abutting said cross frame member, a pair of attachment brackets having U-shaped bight portions compressingly embracing the arcuate portions of said bushings and spaced outwardly from said shoulders to form annular beads in said bushings between the shoulders and the opposing edges of the arcuate portions, said attachment brackets including outwardly extending attachment feet abutting said frame member, means fixedly securing said feet to said frame member, and a bearing in said housing bore for receiving the propeller shaft to rotatably support the shaft in the housing.

3. A hanger for resiliently and rotatably mounting a propeller shaft through a cross frame member of a vehicle, comprising a housing having a central bore therethrough and a pair of integral transversely oppositely extending gudgeons at right angles to said bore, a resiliently yieldable bushing about each of said gudgeons, a pair of attachment brackets including attachment portions and bight portions with the bight portions engagingly embracing said bushings and maintaining them firmly against said cross frame member, means fixedly securing said attachment portions to the cross frame member, and a bearing retained in said housing bore for rotatably supporting the shaft in said housing.

4. A hanger for resiliently and rotatably mounting a propeller shaft through an apertured cross frame member of a vehicle, comprising a housing having a central bore therethrough and outwardly extending bosses formed at right angles to said bore, a resilient bushing about each of said bosses, a plurality of attachment brackets having engagement portions about said bushings, means rigidly securing said brackets to the cross frame member to confine said bushings between said cross frame member and said brackets in a preloaded condition to resiliently suspend said housing in spaced relation to the defining edges of the frame member aperture, and a bearing retained in said housing bore and having a portion disposed about the propeller shaft to rotatably support the shaft in said housing.

5. In a vehicle having a rotatable propeller shaft, a hanger for resiliently and rotatably supporting a shaft from a frame member, comprising a housing having a bore therethrough and bosses at right angles to the bore, a resilient D-shaped bushing about each of said bosses with the flat face lying against said frame member, a plurality of support elements fixedly secured to the frame member and having portions engaging the arcuate face of said bushings to resiliently support said housing on the frame member, and means within said housing bore for rotatably supporting the propeller shaft.

6. In a vehicle having a rotatable propeller shaft, a hanger assembly for resiliently and rotatably securing said shaft to a cross frame member, said hanger assembly comprising a housing for receiving the propeller shaft, bearing means for rotatably supporting the shaft in said housing, said housing having a pair of oppositely extending aligned gudgeons at right angles to the bore with annular shoulders formed on the housing at the inner ends of the gudgeons, a D-shaped resilient bushing encircling each of said gudgeons with the inner bushing ends engaging said shoulders and with the flat faces of the bushings abutting said cross frame member, a pair of attachment brackets having U-shaped bight portions embracing the arcuate portions of said bushings and spaced outwardly from said shoulders, said attachment brackets having outwardly extending attachment feet abutting said frame member, and means fixedly securing said feet to said frame member.

7. A hanger for resiliently and rotatably mounting a propeller shaft through an apertured cross frame member of a vehicle, comprising a housing having a central bore therethrough and outwardly extending bosses formed at right angles to said bore, a resilient bushing about each of said bosses, a plurality of attachment brackets having engagement portions about said bushings, means rigidly securing said brackets to the cross frame member to confine said bushings between said cross frame member and said brackets in a preloaded condition in which the outer periphery of each of said bushings is deformed to provide an irregularly shaped bushing cross section to resiliently suspend said housing in spaced relation to the defining edges of the frame member aperture, and a bearing retained in said housing bore and having a portion disposed about the propeller shaft to rotatably support the shaft in said housing.

References Cited in the file of this patent

UNITED STATES PATENTS

| Number | Name | Date |
|---|---|---|
| 566,544 | Smith | Aug. 25, 1896 |
| 1,799,319 | Reynolds | Apr. 7, 1931 |
| 2,382,246 | McFarland | Aug. 14, 1945 |
| 2,450,279 | Guy | Sept. 28, 1948 |